(12) United States Patent
Drabe et al.

(10) Patent No.: US 8,511,657 B2
(45) Date of Patent: Aug. 20, 2013

(54) TORSION SPRING FOR MICROMECHANICAL APPLICATIONS

(75) Inventors: Christian Drabe, Dresden (DE); Thomas Klose, Dresden (DE)

(73) Assignee: Fraunhofer-Gesellschaft zur Forderung der angewandten Forschung e.V., Munich (DE)

( * ) Notice: Subject to any disclaimer, the term of this patent is extended or adjusted under 35 U.S.C. 154(b) by 1649 days.

(21) Appl. No.: 11/484,250

(22) Filed: Jul. 11, 2006

(65) Prior Publication Data

US 2007/0018368 A1    Jan. 25, 2007

(30) Foreign Application Priority Data

Jul. 13, 2005   (DE) .................... 10 2005 033 801

(51) Int. Cl.
*F16F 1/14* (2006.01)
*F16F 1/18* (2006.01)

(52) U.S. Cl.
USPC ......................................... 267/154; 267/158

(58) Field of Classification Search
USPC ................. 267/158, 160, 154; 200/245, 516; 257/254

See application file for complete search history.

(56) References Cited

U.S. PATENT DOCUMENTS 5,463,233 A * 10/1995 Norling ......................... 257/254
6,639,325 B1 * 10/2003 Schlaak et al. ................ 257/780

FOREIGN PATENT DOCUMENTS

DE          19935819 B4    8/2001

* cited by examiner

*Primary Examiner* — Melody Burch
(74) *Attorney, Agent, or Firm* — Young Basile

(57) ABSTRACT

The invention relates to the torsion springs for micromechanical applications. They can be used if elements are to be pivoted about an axis in an oscillating fashion. According to the object which is set, the torsion springs are to have an improved linear spring characteristic. The torsion springs according to the invention have a square, rectangular or trapezoidal cross section. A slot which is oriented orthogonally with respect to the longitudinal axis of the torsion spring and another slot which is formed in the torsion spring along its longitudinal axis and which opens into the first slot are formed at a clamping end point.

6 Claims, 3 Drawing Sheets

Applicants add longitudinal line 5 to the previous version of Fig. 2

TORSION SPRING FOR MICROMECHANICAL APPLICATIONS

FIELD OF THE INVENTION

The Invention relates to a torsion spring for micromechanical applications.

BACKGROUND OF THE INVENTION

Torsion springs are frequently used on micromechanical elements if they are to be pivoted about an axis in an oscillating fashion. For example, such torsion springs can be connected to plate-shaped elements with which electromagnetic radiation can be reflected. Depending on the pivot angle the angles of the reflected radiation then change.

The entire structure is manufactured here using a microstructure technology which is known per se and also by means of etching methods for etching out of a substrate, frequently silicon.

Owing to the manufacturing technology, the torsion springs usually have a rectangular, square or trapezoidal cross-sectional geometry. However, with these cross-sectional geometries, bulges occur in the cross-sectional faces in the direction of the torsion axis when the elements are deflected. This leads in turn to extensions at clamping end points of the torsion spring and increased tensile stresses which can lead to a fracture. As a result of such extension, the restoring forces are increased, which in turn leads to an increase in a spring stiffness/spring constant. However, since the restoring force of an element to which tensile stress is applied rises progressively with the extension, the fixed clamping gives rise to a progressive, that is to say nonlinear spring characteristic curve.

In order to counteract these disadvantageous effects, slots which are oriented orthogonally with respect to the longitudinal axis of the torsion springs and the torsion axis and which are arranged behind the clamping end point are formed on clamping end points of torsion springs.

In other cases, bent torsion springs were used.

A spring characteristic which is as linear as possible over the respective deflection range when pivoting occurs is aimed at.

SUMMARY

The object of the invention is therefore to make available torsion springs for micromechanical applications which have an improved linear spring characteristic.

The objected is achieved according to the invention with a torsion springs which have one of a rectangular, square and trapezoidal cross section, and a first slot formed orthogonally with respect to the longitudinal axis of the torsion spring at at least one clamping end point, characterized in that another slot is formed in the torsion spring along its longitudinal axis and opens into the first slot.

Advantageous refinements and developments can be achieved in that another slot is formed in the center of the torsion spring.

According to the invention, in this context another slot is formed on the torsion spring. This slot is oriented orthogonally with respect to the first slots which are known from the prior art, and said slot is oriented in the longitudinal axis of the torsion spring. The other slot opens one of its end sides into the first slot.

Another slot is preferably formed in the centre of the torsion spring along its longitudinal axis.

Owing to the resistance torque which is reduced in this area in this way, the stresses and the restoring force of a torsion spring according to the invention are reduced, which in turn leads to a reduction in the nonlinearity of the spring characteristic over the entire deflection range during torsion.

Furthermore it is advantageous to form the other slot in the torsion spring in such a way that the end side which lies opposite the first slot is formed with a convexly rounded shape. In this context, the radius should at least be as large as half the slot width of this slot.

Further details on advantageous refinements will be given below in the description of examples.

Other applications of the present invention will become apparent to those skilled in the art when the following description of the best mode contemplated for practicing the invention is read in conjunction with the accompanying drawings.

DETAILED DESCRIPTION

Figure 1:
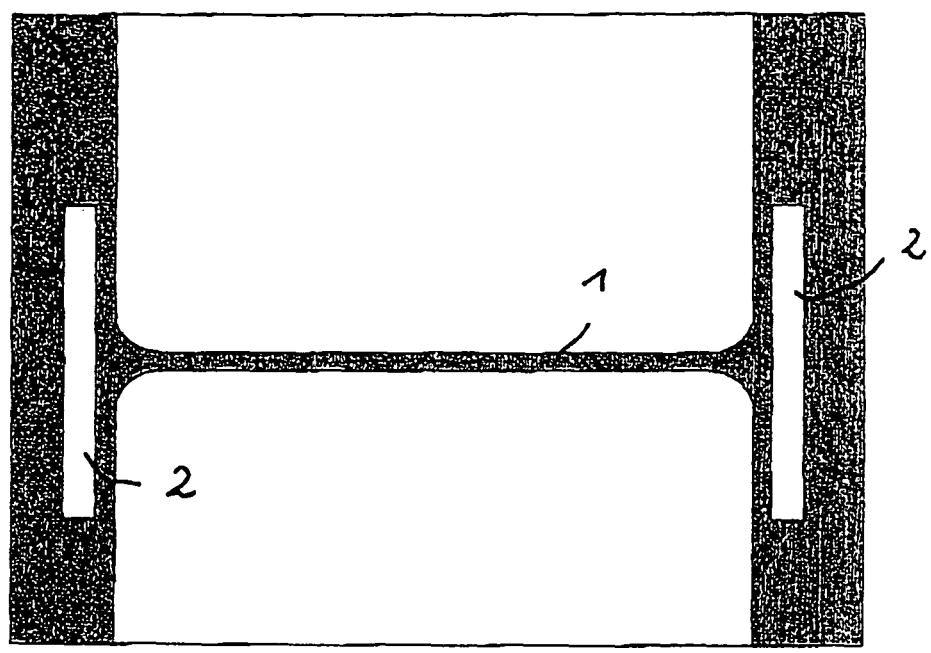
FIG. 1 is a schematic representation of an example according to the prior art.

In FIG. 1, the torsion spring 1 is illustrated schematically with a rectangular cross section in a plan view, said torsion spring 1 having first slots 2 in accordance with known solutions at the clamping end points of the torsion spring 1. These slots 2 are oriented orthogonally with respect to a longitudinal axis 5 of the torsion spring 1. The longitudinal axis 5 of the torsion spring 1 intersects the first slots 2 in the center.

Figure 2:
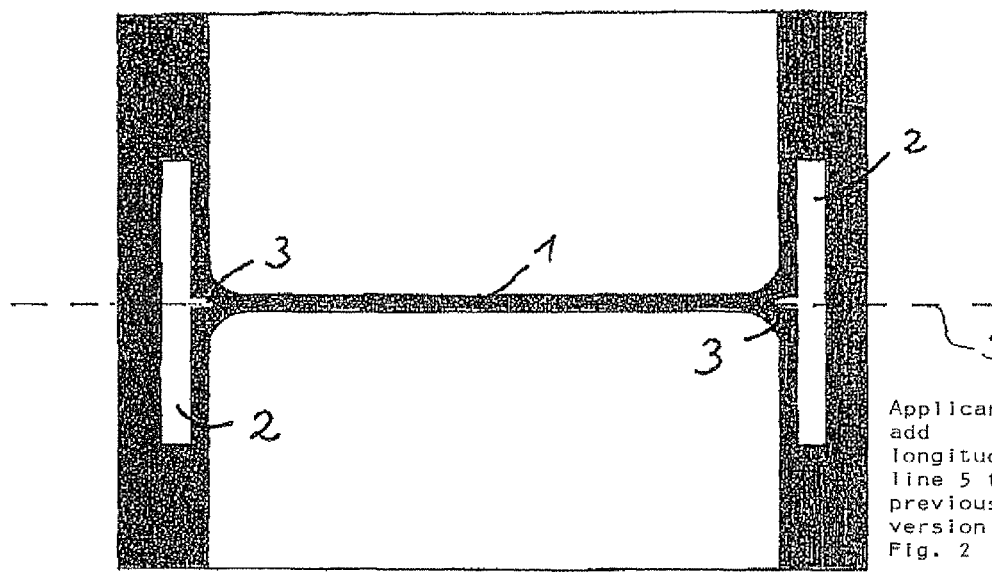
FIG. 2 is a schematic representation of an example according to the invention.

As is illustrated in FIG. 2, a further slot 3 is formed on a torsion spring 1 according to the invention, at least on the side of a clamping end point of the torsion spring 1. Such further slot 3 is formed on both clamping end points in FIG. 2.

The slots are formed in parallel and in the longitudinal axis 5 of the torsion spring 1. They open into the first slot 2 so that an open cavity is formed with the slots 2 and 3 in the torsion spring substrate.

Figure 3:
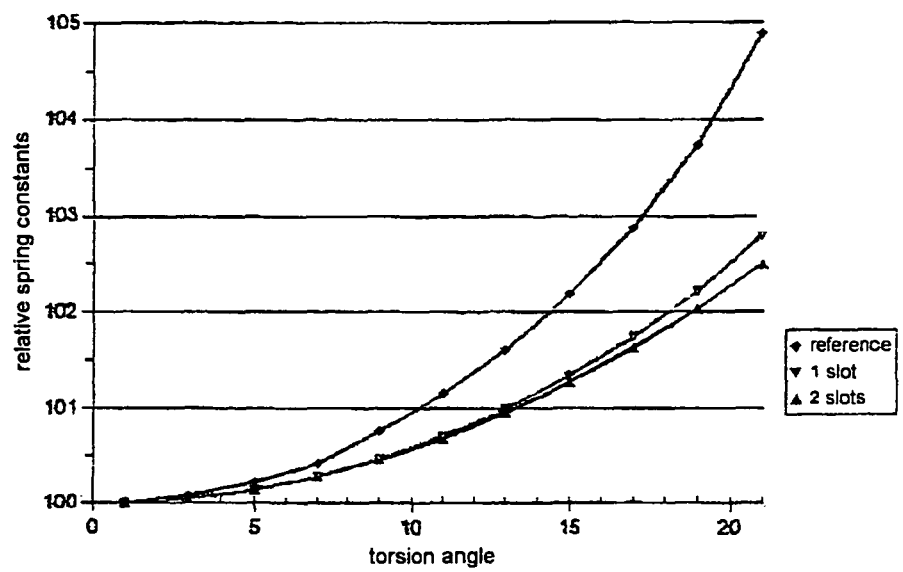
FIG. 3 is a diagram of the relative change in the spring constant as a function of the respective torsion angles.

The diagram shown in FIG. 3 is intended to illustrate how the linear behaviour of the torsion springs 2 according to the invention is improved compared to the known torsion springs.

The profiles of the relative spring constants are therefore illustrated at respective torsion angles.

The upper curve represents the situation with conventional torsion springs without slots.

The center profile corresponds to the ratios with torsion springs 1 with first slots 2, and the lower curve profile applies to torsion springs 1 according to the invention.

It becomes clear that the invention has particularly advantageous effects with relatively large torsion angles and that the nonlinearity can be reduced further there.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A torsion spring for micromechanical applications comprising:
a first clamping end;
a second clamping end spaced from the first clamping end along a longitudinal axis; and
a spring portion extending linearly fully between the first clamping end and the second clamping end along the longitudinal axis, the spring portion having one of a rectangular, square, and trapezoidal cross-section,
wherein at least one of the first clamping end and the second clamping end defines a first slot spaced from the spring portion along the longitudinal axis and extending orthogonally to the longitudinal axis,
wherein the clamping end defining the first slot defines a second slot having a first end opening into the first slot and a second end spaced closer to the spring portion along the longitudinal axis than the first end.

2. The torsion spring of claim 1, wherein the longitudinal axis bisects at least one of the first slot and the second slot.

3. The torsion spring of claim 2, wherein the first and second slots are linear.

4. The torsion spring of claim 2, wherein the longitudinal axis bisects the first slot, the second slot and the spring portion.

5. The torsion spring of claim 1, wherein the second slot is aligned with the spring portion along the longitudinal axis.

6. The torsion spring of claim 1, wherein each of the first and second clamping ends defines the first slot and the second slot.

* * * * *